J. L. MORGAN.
Sugar Skimmer and Cooler.
No. 163,392. Patented May 18, 1875.
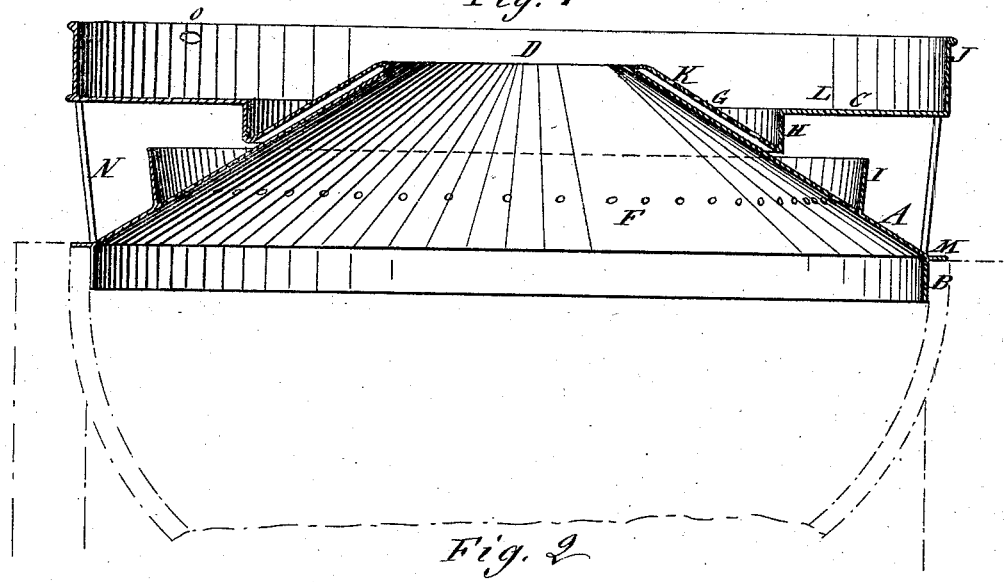
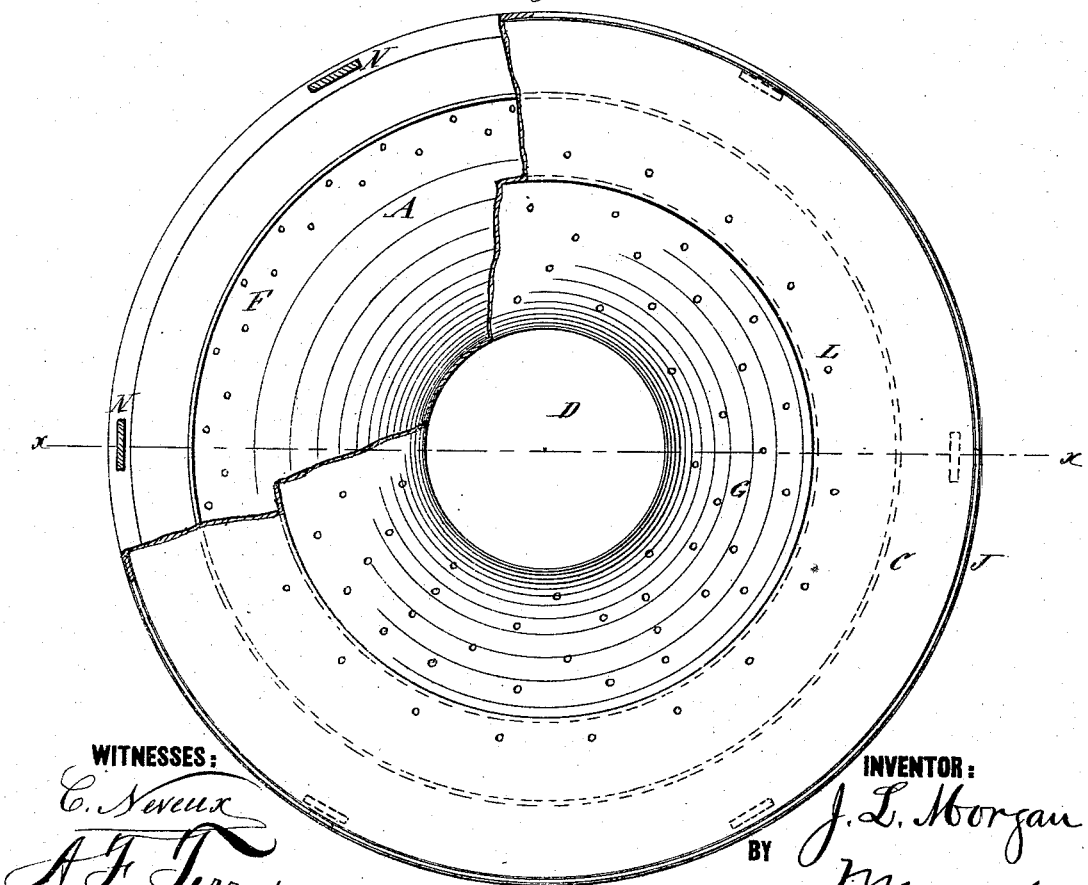
WITNESSES:
C. Neveux
A. F. Terry
INVENTOR:
J. L. Morgan
BY
ATTORNEYS

UNITED STATES PATENT OFFICE.

JOHN L. MORGAN, OF SAVANNAH, GEORGIA.

IMPROVEMENT IN SUGAR SKIMMERS AND COOLERS.

Specification forming part of Letters Patent No. 163,392, dated May 18, 1875; application filed April 24, 1875.

*To all whom it may concern:*

Be it known that I, JOHN L. MORGAN, of Savannah, in the county of Chatham and State of Georgia, have invented a new and useful Improvement in Cooler and Strainer Combined, of which the following is a specification:

In the process of evaporating cane-juice for manufacturing sugar it is usual to have a hand whose special business it is to remove the scum from the boiler, and another to cool the contents and prevent overflow. This is expensive and entirely unnecessary, as my improvement will show; and the invention consists in a strainer which is placed on the boiler, through which the boiling juice overflows, is cooled, and again descends, leaving the scum on the strainer, the strainer being suspended over the boiler from pulleys by cords attached thereto.

Figure 1 is a vertical section of Fig. 2, taken on the line $x\, x$. Fig. 2 is a top view partly in section.

Similar letters of reference indicate corresponding parts.

A is the main cone, (or frustum of a cone,) which extends from the boiler-flange B above the horizontal portion C, and to the central orifice D. This cone has one or more rows of holes, F, through it, as represented, through which the juice is returned to the boiler. G is another cone attached at the top to the large cone A, of corresponding shape, but raised a little therefrom, and extending down to the offset H. I is a flange attached to the large cone A, just below the holes F. J is the rim of the strainer, which is above the aperture D, which confines the overflow. The boiling juice with the floating scum overflows through the orifice D, and spreads over the upper surface of the strainer, on which the scum is left, while the juice descends through the perforation K onto the cone A, and is returned to the boiler through the holes F. The flange I prevents the further descent of the juice. L represents one or more rows of holes through the horizontal part C, which discharge onto the large cone A above the flange I. The rim M of the large cone A rests upon the boiler, and forms a right angle with the boiler-flange B. The horizontal part C is supported by stays N from the base of the large cone. O are holes (three or more) through the upper rim, to allow cords to be attached, by means of which cords the strainer is suspended from pulleys above the boiler, so that it may be conveniently raised and lowered. This strainer may be used for all the purposes for which it is adapted.

Having thus described my invention, I claim as new and desire to secure by Letters Patent—

A cooler and strainer constructed substantially as described—that is, having a large cone, A, with perforations and flanges for the boiler, stop flanges H and I, a short perforated cone, G, horizontal part C, aperture D, and rim-flange J, for the purposes described.

JOHN L. MORGAN.

Witnesses:
B. D. MORGAN,
J. J. ABRAMS.